Feb. 19, 1929.　　　　　　　　　1,702,349
G. KRELL
ELEVATOR
Filed Dec. 23, 1926　　　3 Sheets-Sheet 1

INVENTOR
George Krell
BY
ATTORNEY

Feb. 19, 1929.  G. KRELL  1,702,349
ELEVATOR
Filed Dec. 23, 1926   3 Sheets-Sheet 2

INVENTOR
George Krell
BY Arthur C. Brown
ATTORNEY

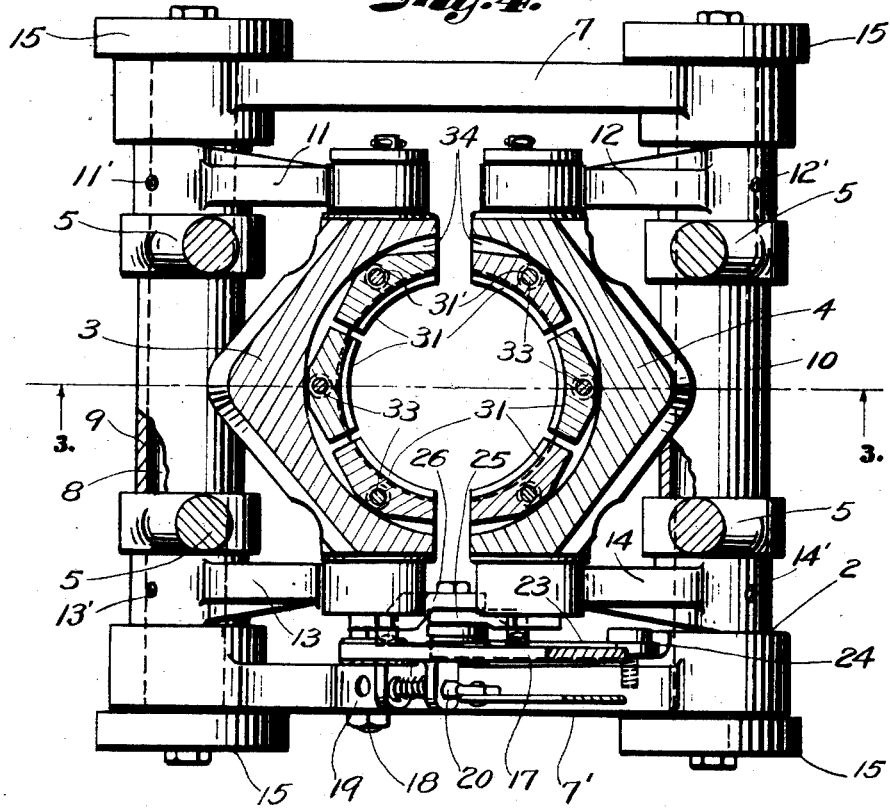
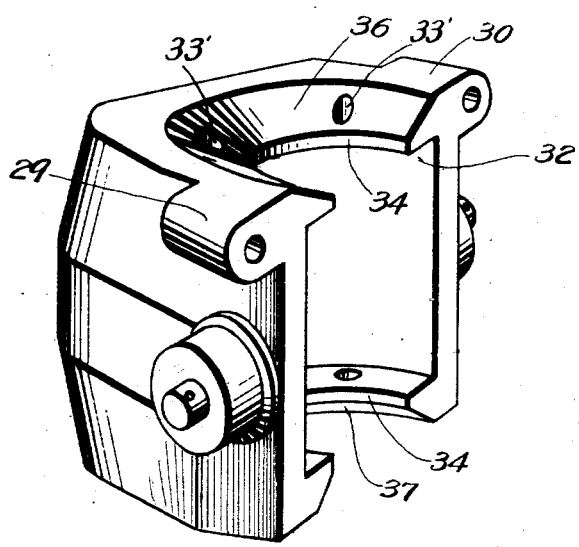
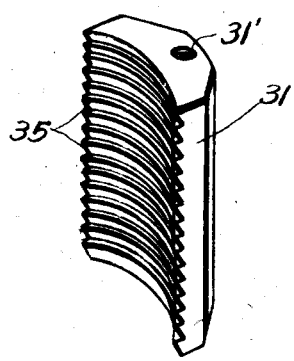

Patented Feb. 19, 1929.

1,702,349

UNITED STATES PATENT OFFICE.

GEORGE KRELL, OF SAPULPA, OKLAHOMA.

ELEVATOR.

Application filed December 23, 1926. Serial No. 156,579.

My invention relates to casing elevators employed in the practice of oil and other well operations and has as its principal object the provision of a construction which will accommodate itself to the circumference and successfully grip casing or tubing, hereafter referred to as "pipe" and particularly those which may be out of round or contain other irregularities due to improper rolling, rust, corrosion, or accident.

The invention has as a further object the production of a structure having jaws, each of which has several gripping elements for engagement with the pipe at several different points throughout the circumference of the pipe and are movable relatively to each other to compensate for irregularities in the circumference of the pipe and thereby accommodate and securely grip the pipe.

It is another object of the invention to construct the jaws so that the gripping elements may be received by the jaws and be disposed therein and with relation to each other to properly embrace the pipe and apply the force of the gripping elements to the pipe at several points of the circumference of the pipe and thereby result in the application of the proper holding action of the gripping element upon the pipe.

It is a further object of the invention to associate with the jaws a mechanism for actuating the jaws to cause the jaws to grasp and release the pipe.

The invention has other objects, all of which will be more readily understood when read in conjunction with the accompanying drawings which show one embodiment of which the invention is susceptible, it being obvious, however, that changes and modifications may be resorted to without departing from the spirit of the appended claims forming a part hereof.

In the drawings:

Fig. 4 is a section on line 4—4 of Fig. 3.

Fig. 5 is a detail perspective view of one of the holding jaws employed in the structure.

Fig. 6 is a detail perspective view of one of the gripping elements which is associated with the jaw shown in Fig. 5.

Fig. 7 is a detail perspective view of one of the operating arms for actuating the jaws.

Fig. 8 is a detail perspective view of one of the side bar members employed in the construction.

Figure 1:
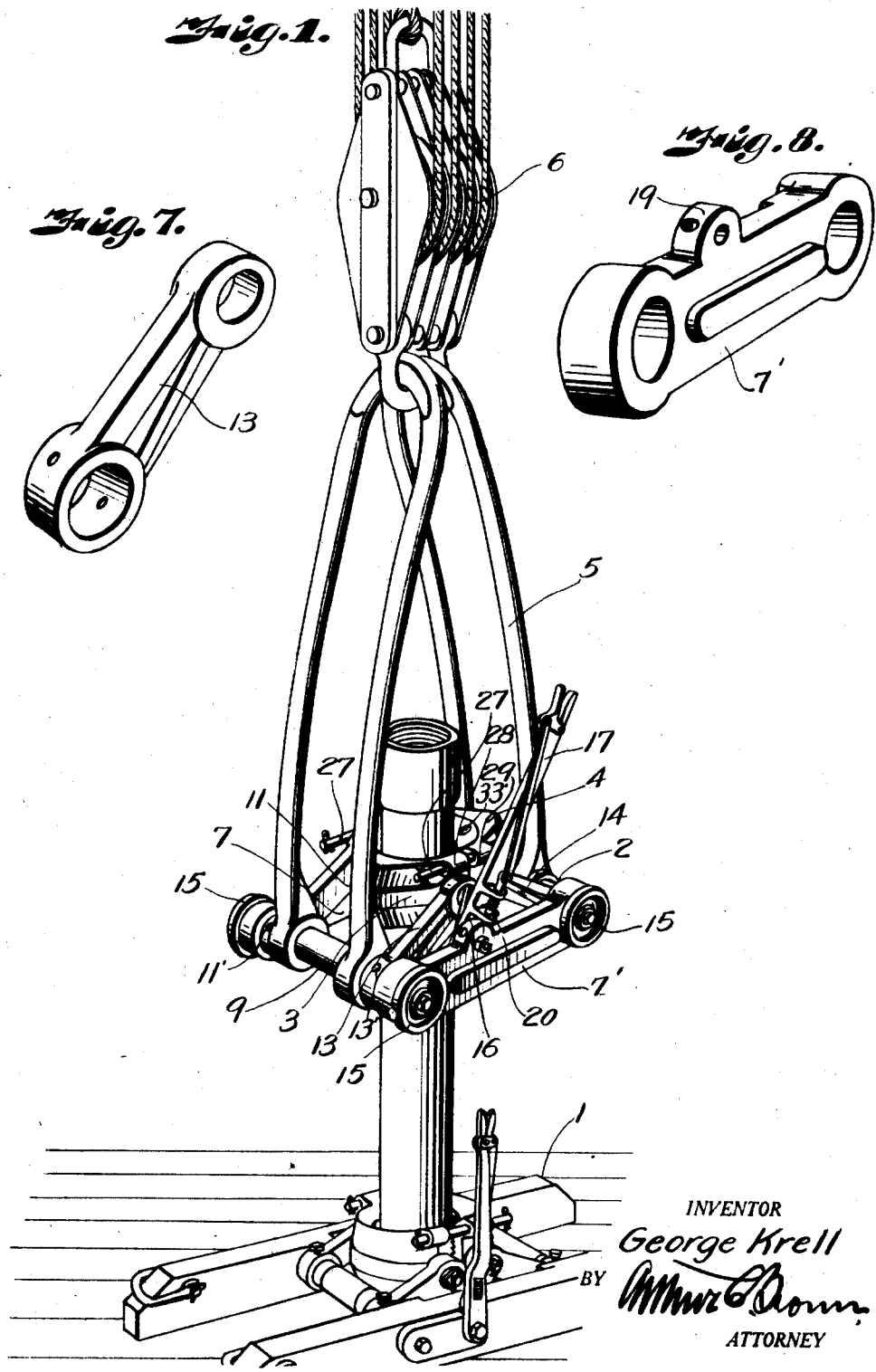
Fig. 1 is a perspective view of the device showing its application for use and in engagement with the pipe.
Figure 2:
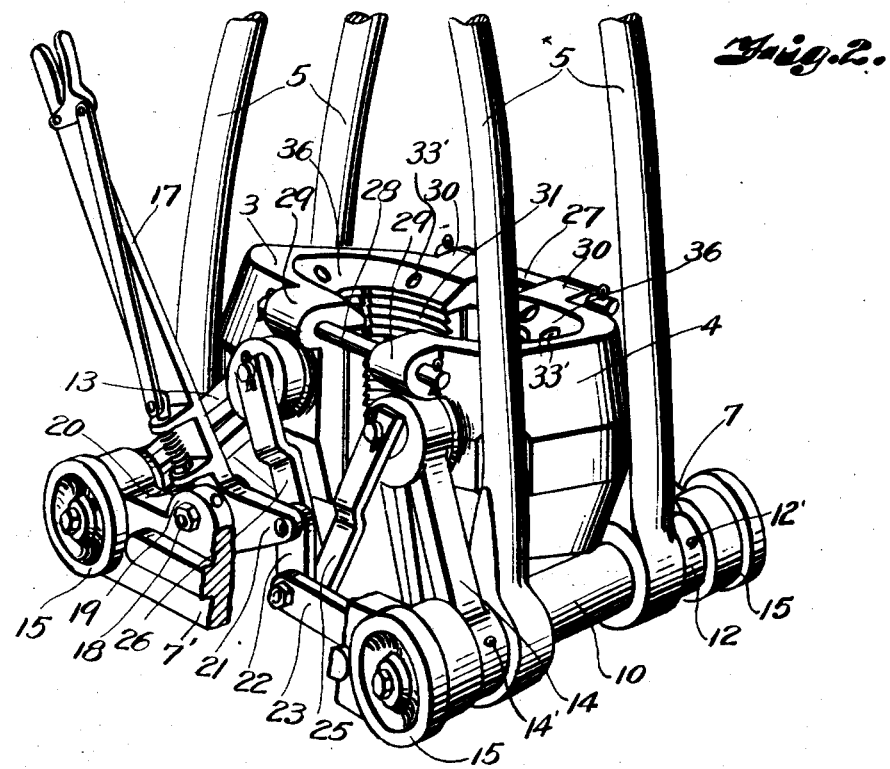
Fig. 2 is a perspective view of the device partly broken away for better illustration of the operating mechanism.
Figure 3:
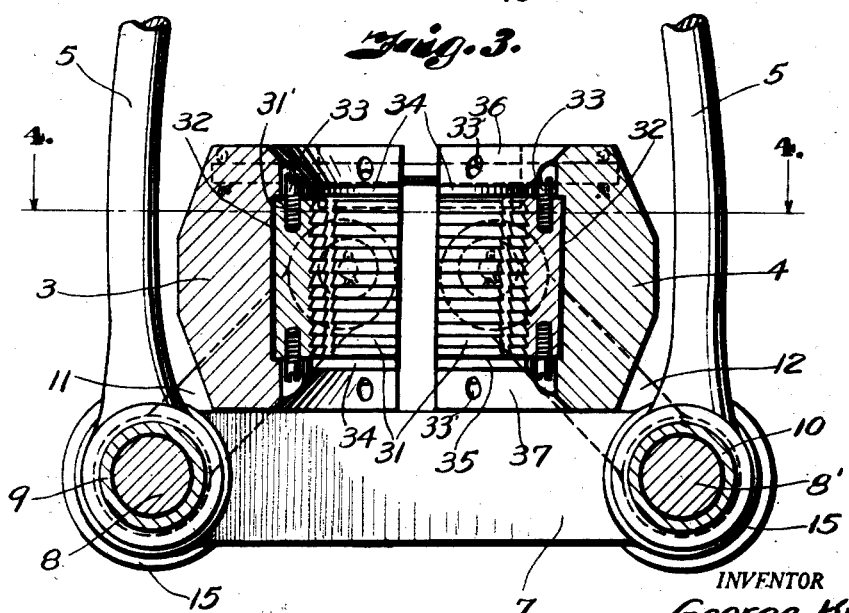
Fig. 3 is a section taken on the line 3—3 of Fig. 4.

Referring more in detail to the drawings:

1 designates the platform of a derrick and a casing spider which is positioned over the mouth of an oil or other well and is adapted to receive casing or tubing for lowering or lifting movement therethrough or to engage the same and hold it suspended within the well while its engagement with an elevator is being effected.

The elevator generally designated 2 consists of a plurality of elements which are connected together so as to form a substantially rectangular frame for supporting the movable jaws 3 and 4 and to which lifting bails 5 are connected for association with a tackle 6. The rectangular frame 2 includes the parallel side bars 7 and 7′ which have their opposite ends respectively connected to shafts 8 and 8′ and thus forms a frame by and within which the jaws 3 and 4 are mounted. The ends of the bails 5 are pivotally secured to the shafts 8 and 8′ and are held in spaced relation to each other by means of the spacers 9 and 10 arranged upon the shafts. The jaws 3 and 4 are held in associated relation with the frame of the elevator by means of the arms 11, 12, 13 and 14 each having one end adjustably fixed on a shaft 8 or 8′ by a pin or set screw 11′, 12′, 13′ or 14′ and having their opposite ends in pivotal connection with the jaws 3 and 4 so that when the arms at one side of the structure are rocked as hereinafter described, the jaws are moved as a unit and any looseness due to play of the arms on the shafts is obviated.

Rollers 15—15 are mounted upon the ends of the shafts 8 and 8′ and provide casters whereby the entire device may be conveniently transported from one location to another.

A means is provided for actuating the jaws so as to releasably engage the pipe. This means is generally designated 16 (Fig. 1) and includes a lever 17 which is pivotally connected at 18 to one of the side bars, such as 7′, which side bar has a portion 19 providing means with which a detent 20 of the lever co-operates to hold the lever mechanism and the jaws in operative or inoperative condition.

The lever 17 has an extension 21 which, through the medium of a link 22 is connected to the pivoted arm 23, which is pivotally connected at 24 to one of the side arms, such as 7'. A connection is formed through the medium of the links 25 and 26 with the arm 23 and said links have their opposite ends respectively attached to each of the jaws at the connection of the arms 13 and 14 with the jaws from which it is evident that upon actuation of the lever 17, the jaws 3 and 4 will be moved to cause their engagement with or release from a pipe located between the jaws, the link connection effecting a compound leverage making it possible to easily open or close the heavy jaws with a minimum of effort applied through the lever 17.

The jaws 3 and 4 are connected together by means of the horizontally arranged parallel tie rods 27 and 28, which are slidably mounted in the apertured lugs 29 and 30 respectively provided upon each of the jaws 3 and 4 and upon opposite sides thereof so as to receive the rods and retain the jaws in proper vertical alignment with each other when actuated to open and close upon a pipe.

Each of the jaws 3 and 4 is designed to accommodate several gripping elements designated 31, which are disposed relatively to each other so that one of the gripping elements is interposed between others thereof carried by each of the jaws so that the pipe will be engaged at several different points of its circumference when the jaws are closed to grip the pipe.

These gripping elements 31—31 are arranged in recesses 32 provided in the inner faces of the jaws 3 and 4 and are pivotally mounted in said recesses by means of the pivots 33 which are passed through apertures 33' in the flanges 34—34 into an aperture 31' in a gripping member forming the upper and lower walls of said recess 32 in which the gripping elements are located, the recess being of substantially greater diameter than the pivot members to permit play of the members and thereby afford flexibility of movement of the gripping member to permit their automatic adjustment to the carrier.

One face of the gripping elements 31 is provided with serrations 35, which are designed to grip the pipe and hold it against slippage with relation to the jaws and each gripping element has its opposite face formed so that the gripping elements may move on their pivots within the recessed portions of the jaws.

By reference particularly to Fig. 4 it will be noted that the gripping elements are disposed as hereinbefore referred to and that one of the several gripping elements of one of the jaws is arranged diametrically opposite a similar gripping element of the other jaw. This relative arrangement of the several gripping elements insures engagement of the gripping elements with pipe at several different points of the circumference of the pipe to effectively grip the pipe and hold it, even though the circumference of the pipe is of an irregular character or has a surface which is out of round, due to improper rolling, rust, corrosion or accident.

The flanges 34—34 of the jaws 3 and 4 have their outer edges, such as 36 and 37, beveled so as to facilitate the association of the jaws with the pipe.

From the foregoing description it is manifest that a supporting frame is provided within which the clamping jaws are mounted for movement toward and away from each other and relative to a pipe to effect holding and release of the pipe. It is further evident that each jaw is provided with several gripping elements which are pivotally mounted and disposed relatively to each other so that the pipe will be engaged by the gripping elements at several different opposed points throughout the circumference of the pipe which thus will result in producing the proper holding or gripping action upon the pipe, even though the pipe is more or less irregular in outline.

What I claim and desire to secure by Letters Patent is:

1. In a casing elevator the combination of jaws, a frame for supporting said jaws, a lever mechanism for actuating said jaws, said lever mechanism including a lever and a pivoted arm, a link connecting the pivoted arm and lever and links respectively connected with the jaws and with said pivoted arm.

2. A device of the character described including a frame, jaws on said frame, lever and arm members pivoted on said frame, a link connecting the lever and arm members, and links connected with said arm member coaxially with the link connection and attached to said jaws.

3. A device of the character described including a frame, arms pivotally mounted in the frame, jaws pivotally mounted on said arms, a lever on said frame, an arm pivotally mounted on said frame, a link pivotally connected with said arm and with said lever, and links connected with said jaws and with said arm operable by said lever to open the jaws.

4. A device of the character described including a frame, paired jaws pivotally mounted on the frame, lever and arm members pivotally mounted on the frame, links pivotally connected with said jaws, a pivot member connecting both of said links with said arm, and a link on said pivot member connected with said lever.

In testimony whereof I affix my signature.

GEORGE KRELL.